United States Patent [19]

Tarasov et al.

[11] 4,365,137

[45] Dec. 21, 1982

[54] APPARATUS FOR ELECTRIC-ARC GAS-SHIELDED SURFACING BY DROPLETS WITH CONSUMABLE ELECTRODE

[76] Inventors: Nikolai M. Tarasov, ulitsa Chkalova, 7, kv. 30; Nikolai A. Varukha, ulitsa Kamenets-Podolskaya, 28, both of Kharkov; Rostislav L. Brontman, ulitsa Vutechicha, 5, kv. 92, Moscow; Boris A. Slesarev, pereulok Pletnevsky, 3, kv. 9, Kharkov; Anatoly M. Zhukov, ulitsa Geroev Truda, 38, kv. 223, Kharkov; Valery V. Mizik, pereulok Uritskogo, 2, kv. 9, Kharkov; Evgeny P. Rogachev, ulitsa Akademika Proskury, 5, kv. 26, Kharkov; Nikolai I. Gurnov, ulitsa Geroev Truda, 4, kv. 8, Kharkov, all of U.S.S.R.

[21] Appl. No.: 201,395

[22] PCT Filed: Aug. 30, 1979

[86] PCT No.: PCT/SU79/00079

§ 371 Date: Oct. 28, 1980

§ 102(e) Date: Oct. 28, 1980

[87] PCT Pub. No.: WO80/01772

PCT Pub. Date: Sep. 4, 1980

[30] Foreign Application Priority Data

Feb. 28, 1979 [SU] U.S.S.R. ............................. 2725299
Feb. 28, 1979 [SU] U.S.S.R. ............................. 2725300

[51] Int. Cl.³ ............................................. B23K 9/04

[52] U.S. Cl. ........................... 219/137.31; 219/76.14; 219/125.1

[58] Field of Search ............. 219/76.14, 137.31, 137.7, 219/125.1

[56] References Cited

U.S. PATENT DOCUMENTS 2,504,761  8/1946  Simmie ............................. 219/137.7
2,916,601 12/1959  Lesnevich ........................ 219/76.14

FOREIGN PATENT DOCUMENTS 155588  4/1976  U.S.S.R. .
591279  2/1978  U.S.S.R. .

*Primary Examiner*—Elliot A. Goldberg
*Attorney, Agent, or Firm*—Fleit & Jacobson

[57] ABSTRACT

An apparatus for electric-arc gas-shielded surfacing by droplets with consumable electrode calls for an electrode to be fed through a current contact tip to the surface of an article being surfaced. An arc is ignited to form a molten droplet on the end of the electrode, and a shielding gas is fed into the melting zone. Subsequently, an accelerating translatory motion is imparted to the current contact tip and the electrode until they reach a speed at which the kinetic energy of the molten droplet exceeds the energy sufficient for detaching the droplet from the electrode, whereafter the tip and the electrode are stopped by a fixed barrier so that inertia causes the droplet to detach from the electrode. The apparatus includes an electrode feeding mechanism, a nozzle, a drive for imparting accelerating translatory motion, a fixed barrier arrester, an electrode holder, clamping members and a pusher.

12 Claims, 12 Drawing Figures

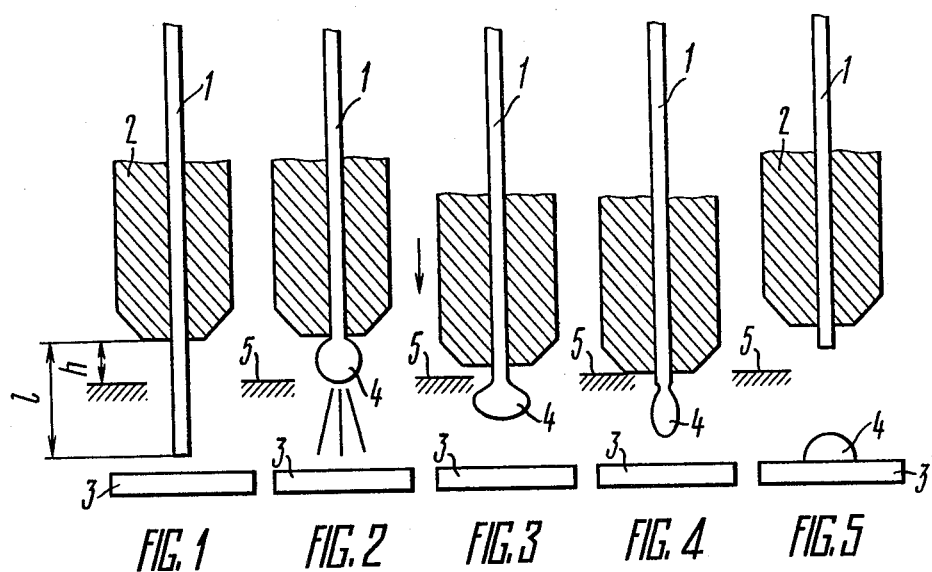

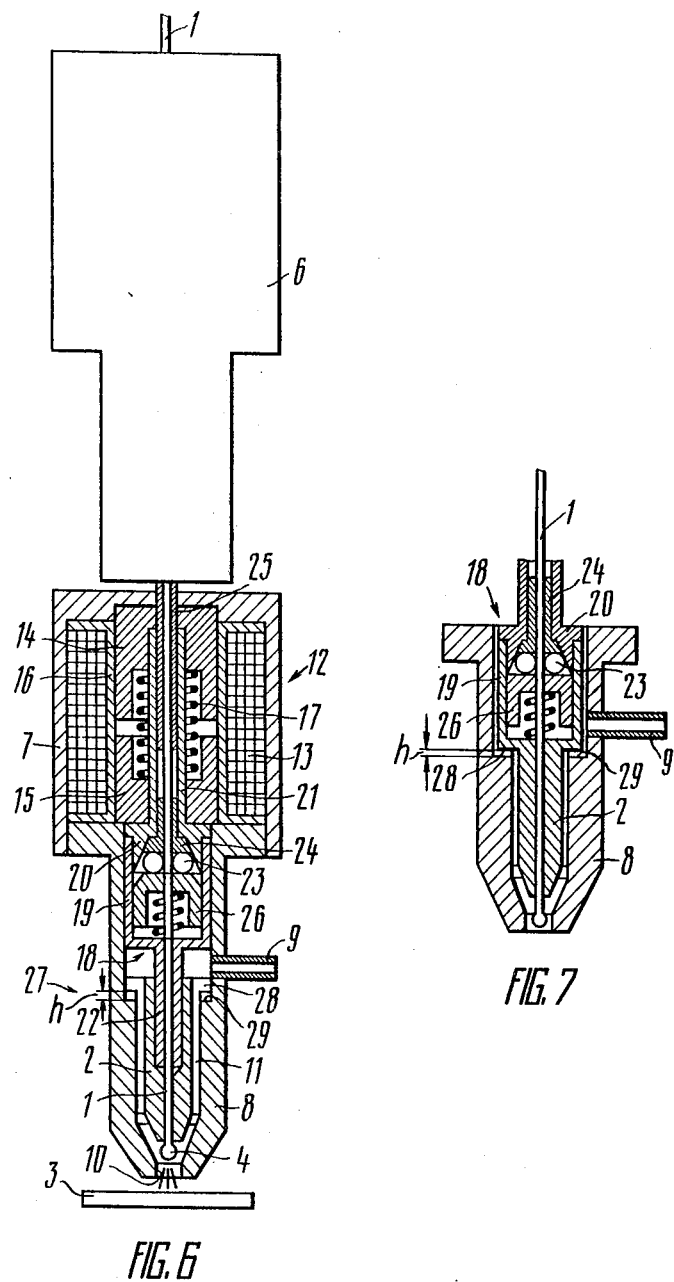

APPARATUS FOR ELECTRIC-ARC GAS-SHIELDED SURFACING BY DROPLETS WITH CONSUMABLE ELECTRODE

TECHNICAL FIELD

The present invention relates to welding processes and equipment, and particularly to an apparatus for electric-arc gas-shielded surfacing by droplets with consumable electrode.

The best use of the invention can be made in building up electric contacts onto contact holders used in manufacturing switching equipment in electrical engineering and instrument making.

In addition, the invention may be used for welding and soldering various articles by separate droplets with consumable electrodes made of such materials as high-temperature solders, low-temperature solders and steels.

BACKGROUND ART

The efficiency and quality of droplet surfacing depends to a great extent on the rate of electrode melting and on a method used for controlling the detachment of droplets from the electrode and transferring said droplets onto the surface of an article being surfaced.

The problem of controlling the process of droplet detachment and the droplet transfer onto the surface of the article is of a special importance in forming the contacts on contact holders.

Known in the art methods of forming contacts on the contact holders have a number of disadvantages. Thus, a widely spread method of forming the contacts by rivetting contact plates onto the contact holders does not provide for a high stability of contact resistance since in the course of operation the riveted contacts may get loose which results in that the area of contact between the contact plate and the contact holder changes.

Furthermore, the above method is a highly labour-consuming one and causes an elevated consumption of precious metals such as platinum, gold and silver used for manufacturing contact plates. In some cases the loss in weight of a precious metal in the process of cutting-out the contact plate and securing the latter to a contact holder by rivetting exceeds by 25–40% the weight of the contact plate proper.

Soldering the contact plates onto contact holders provides for a higher reliability of the contact connection, however said reliability being ensured only at normal temperatures. At elevated temperatures soldered contacts are not reliable in operation. This method is also a labour-consuming one. In addition, soldering contacts does not practically lend itself to be readily automated, and has therefore a relatively low efficiency.

For fabricating electric contacts use is also made of a method incorporating fixing the contact plates onto contact holders by means of resistance welding, and in particular spot welding. This method feature a higher efficiency and readily lend itself to automation, but does not provide for a high strength and reliability of the joint weld between the contact plate and the contact holder, since the area of the weld spot is much smaller than that of the contact plate. Moreover, quality control of the joint weld produced by this method is difficult to effect.

At present the most efficient technique of forming the electric contacts on contact holders is a process including electric-arc surfacing which in comparison with the above-mentioned methods makes it possible to considerably enhance the strength and reliability of the contact joint, and the stability of the contact resistance, to reduce the consumption of precious materials, and to fully automatize the process.

There is known a method of electric-arc consumable-electrode droplet surfacing /USSR Author's Certificate No. 260,768, 1970/ which comprises feeding a consumable electrode through a current contact tip with a constant rate towards the surface of an article being surfaced, igniting arc between the electrode and the surface of the article so as to form a droplet on the electrode end, moving the tip relative the electrode in the direction opposite to the direction of feeding of the electrode in order to cause detachment of the molten droplet onto said surface of the article. The magnitude of the arc ignition current, the electrode feed rate, and the distance between the end of the current contact tip and the surface of the article are selected so that the molten droplet forms at the end face of the current contact tip.

At the beginning of the electrode melting the rate of melting thereof is higher than the rate of feeding of the electrode, as a result of which the molten droplet approaches the nozzle end and cools down due to the fact that the current contact nozzle serves as a heat removal means. Partially, removal of heat through the current contact nozzle causes the rate of electrode melting to slow down.

The rate of electrode melting become equal to the rate of feeding of the electrode, and the molten droplet all the time is at the end of the nozzle. As the electrode is advanced the size of the droplet continuously increases, and after the molten droplet acquires a required mass the nozzle is removed from the droplet in the direction opposite to the direction of feeding of the electrode. As a result, the droplet ceases cooling down, its temperature sharply rises, the resistance to its detachment decreases and the droplet falls down onto the surface of the article.

An apparatus for carrying out the above method comprises a means for feeding a consumable electrode with a constant speed in the direction of the surface of an article being surfaced, a current contact nozzle, and a drive for reciprocatingly moving the current contact nozzle relative the electrode /"Novaya tekhnologiya, kompleksnaya mekhanizatsiya i avtomatizatsiya svarochnogo proizvodstva" 1977, Kiev, "Tekhnika", Tarasov N. M., Slesarev B. A., Khristoforov B. M. "Argon-no-dugovaya naplavka electricheskikh kontactov", pp. 62–65/.

The above method and apparatus for carrying out this method allow stability of the mass of the droplets to be improved only if the droplet mass is close to a value at which there occur non-controllable /spontaneous/ detachment of the droplets.

By the expression "the mass of droplet for non-controllable detachment" is meant a mass at which the gravity force of the molten droplet exceeds the sum of the forces retaining the droplet at the end of the electrode.

It should be noted that such a method and apparatus do not provide for the detachment of the droplets having a mass which is less than the mass required for non-controllable detachment, which considerably limits a controllable range of the mass of the droplets being detached.

There is also known a method of electric-arc consumable electrode surfacing by droplets /cf. CzSR Pat. No. 116,410, Int. Cl.² B 23K 9/12, 1970/ which comprises feeding a consumable electrode through a current contact nozzle towards the surface of an article being surfaced, igniting an electric spark between the electrode and the surface of the article to form on the electrode tip a molten droplet, translatory moving the electrode with the droplet thereon towards the surface with a speed at which the kinetic energy of the molten droplet does not exceed the energy required for the detachment of the droplet from the electrode, and subsequently causing the droplet to detach and fall down onto the surface of the article, which is effected by imparting to the electrode together with the droplet accelerating motion in the direction opposite to the direction of the electrode feeding.

The above method is carried out with the use of a known in the art apparatus /cf. USSR Author's Certificate No. 526,468, Int. Cl. B 23K 9/12, 1976/ comprising a means for feeding a consumable electrode to the surface of the article being surfaced, and a current contact tip fixed at a predetermined distance from the surface of said article. The means for feeding the electrode includes a cam disk determining the electrode feed speed, connected with a rotational drive and an electrode holder mounted for reciprocal movement relative the current contact tip. The cam disk profile is formed by an intermittently decreasing radius. A spring mounted between the electrode holder and the current contact tip continuously maintains a contact between the electrode holding means and the cam disk.

In operation the cam disk, while rotating, impart a translatory motion to the electrode holder together with the electrode clamped thereby towards the surface of the article being surfaced. At the same moment a spark is ignited between the electrode and said surface, and as a result of sparking a molten droplet is formed on the tip of the electrode.

At the moment when the cam disk acts with its notch upon the electrode holder there occur a change in the movement of the electrode holder. Said holder under the action of the spring begins to acceleratingly move in the direction opposite to the direction of feeding of the electrode, which results in the detachment of the molten droplet and forcing said droplet to fall down onto the surface of the article, the acceleration of this movement is determined by the spring characteristic.

The method and the apparatus described above enable controlling the mass of the molten droplets in a wide range, and thereby provide forming droplets having a mass being considerably smaller than the mass of the droplets in the case of non-controllable detachment.

However, the above method and apparatus do not provide for a high accuracy of transfer of droplets onto the surface of an article being surfaced due to the fact that at the moment of detachment of the drops from the electrode, while the latter is moving in the direction opposite to the direction of feeding of the electrode, the said drop also receive a motive pulse causing it to move in the same direction as the electrode does, which distorts the droplet falling path towards the surface of the article. Moreover, when in use they do not always ensure the required mass of droplets since at the moment of detachment of the droplet a portion thereof remains on the electrode.

The USSR Author's Certificate No. 453,008 /Int. Cl. B 23K 9/12, 1976/ discloses a method of electric-arc gas shielded surfacing by molten droplets with consumable electrodes which comprises the steps of feeding a consumable electrode through a current contact tip to the surface of an article being surfaced, igniting electric arc between the electrode and the surface of the article to form a molten droplet on the electrode end, feeding a shielding gas into the electrode melting zone, and subsequently causing said tip to translatory move towards the surface of the article. The tip while moving in said direction relative the electrode shoves the droplet, thereby throwing it down onto the surface of the article, whereafter the tip moves back to its initial position. By varying the speed of movement of the tip relative the electrode the speed of movement of the molten droplets towards the surface of the article may be also varied. Varying the electrode feed rate and presetting the frequency of impacts of the tip enable the mass of molten droplets to be varied in a wide range.

The above-described method is practiced with the use of an apparatus comprising a means for feeding a consumable electrode towards the surface of an article being surfaced, and a body wherein is mounted a nozzle provided with an inlet pipe for feeding a shielding gas into a cavity of said nozzle and having an opening adapted for directing said gas into the electrode melting zone /cf. "Povyshenie proizvoditelnosti i katchestva naplavochnyh rabot pri remonte i isgotovlenii detalei mashin i mekhanizmov", published in Moscow in 1977 (Moskva, Moskovskiy dom nauchno-tehnicheskoi propagandy im. F. E. Dzerdzinskogo): N. M. Tarasov i B. A. Slesarev. "Elektrodugovaya naplavka elektricheskih kontaktov", see pp. 141-146, and in particular p. 142/.

The above apparatus includes a current contact tip mounted inside the nozzle and provided with a hole for the electrode to pass through, which current contact tip is connected to a reciprocating drive capable of imparting to said tip on accelerating motion relative the nozzle in the direction of the surface of the article being surfaced. The tip is provided with a return spring.

The method and the device described above ensure a high degree of accuracy of transfer of the molten droplet onto the surface of the article. However, at the moment when the droplet is detached by the tip, a portion of the molten droplet which contacts the tip is cooled down with the result that the viscosity of said portion increases, which leads to the result that this portion of the droplet is retained on the electrode, thereby lowering the stability and accuracy of the droplet mass control in the course of surfacing.

Furthermore, this method ensures reliable detachment of the droplet by said current contact tip only when the diameter of the droplet is at least 1.5-2 times exceeds the diameter of the electrode. Otherwise, the tip moving along the electrode by-passes the droplet without detaching it. Therefore the range of modifying the droplet mass is limited.

DISCLOSURE OF INVENTION

The invention resides in the provision of an apparatus for electric arc gas-shielded surfacing by droplets with consumable-electrode, which by changing the nature of detachment of molten droplets from the electrode end onto the surface of the article being surfaced provides for the stability of the mass of the droplets being detached in a wide range of controlling this mass and a high accuracy of deposition of the molten droplet onto a predetermined point on the surface of the article.

The object of the invention is attained by providing an apparatus for electric-arc gas-shielded surfacing by droplets with a consumable electrode, the apparatus feeding said electrode through a current contact tip to the surface of an article being surfaced, igniting an arc between the electrode and the surface of the article to form on the electrode end a molten droplet, feeding a shielding gas into the electrode melting zone, and subsequently imparting to the current contact tip an accelerating translatory motion in the direction of the surface of the article for throwing down the molten droplet onto said surface. According to the invention, a translatory accelerating motion is also imparted to the electrode together with the molten droplet until said electrode and said droplet acquire a speed at which the kinetic energy of the molten droplet exceeds the kinetic energy sufficient for the detachment of the droplet from the electrode whereafter the tip and the electrode are sharply stopped by they running against fixed barrier to cause inertia detachment of the droplet from the electrode.

During such a process of surfacing the molten droplet has a less contact with the tip and, hence is less cooled, which enhances the reliability of its detachment and provides the transfer of practically all the molten metal onto the surface of the article, thereby ensuring a better stability and accuracy in the droplet mass control.

Due to an abrupt interruption of movement of the tip and the electrode by impacting against a fixed barrier the reliability of the detachment of the droplet does not depend on its mass, and in particular, on the ratio of the droplet diameter of the diameter of the electrode. This enables the droplets to have a corresponding mass in response to each control action, owing to which there is provided a possibility to detach not only the droplets having the diameter exceeding the diameter of the electrode but also the droplets whose diameter does not exceed the diameter of the electrode, and to thereby widen the droplet mass control range.

Furthermore, such process of surfacing provides for a directed accelerated motion of the droplets in the direction of the surface of the article being surfaced, which directed motion determines the falling path of the droplet after its being detached from the electrode as a result of the abrupt cessation of its motion. This improves the accuracy of hitting a predetermined point on the surface of the article.

It is expedient to impart to the current contact tip and the electrode a motion with a constant acceleration, which will ensure a more stable shape of the droplet while accelerating the tip and the electrode to said speed, which is attained due to the smaller oscillation of the free surface of the droplet and lesser displacement thereof from the electrode axis, which improves the accuracy of controlling the mass of droplets and of positioning them onto the surface of the article.

It is advisable to impart to the tip and the electrode a constant acceleration in the range from 10 to 200 m.p.s$^2$. until a speed of from 0.2 to 3.0 m/s is reached. Such acceleration and speed will provide the most favorable conditions for accelerating the tip with the electrode and detaching the droplet of different mass.

If the acceleration is below 10 m.p.s$^2$. and the speed is below 0.2 m.p.s. the detachment of the droplets even if they have a considerable mass is not stable. In the case of the acceleration being higher than 200 m.p.s$^2$., and the speed being higher than 3 m.p.s. the droplets tend to be strongly deformed and fractured, which results in electrode metal splashing and leads to an increased loss thereof.

The object of the invention is also attained in that an apparatus for electric-arc gas-shielded surfacing by droplets with consumable electrode comprises means for feeding a consumable electrode to the surface of an article being surfaced, and a body wherein there are mounted a nozzle provided with an inlet pipe for supplying a shielding gas into a cavity of said nozzle and having an opening adapted for directing the shield gas into the electrode melting zone, a current contact tip introduced into said nozzle and having an aperture for the electrode to pass through, and a drive adapted for acceleratingly moving said tip relative the nozzle in the direction of the surface of the article. According to the invention, the apparatus is provided with an arrester adapted to stop the tip while the latter is moving relative to the nozzle, and an electrode holder adapted for clamping the electrode and transmitting thereto and to the tip from said drive an accelerating translatory motion relative to the nozzle, which electrode holder being provided with a sleeve rigidly connected to the tip and to said drive, and having clamping members located within said sleeve, and a pusher connected with the electrode feeding means and mounted for acting upon the clamping members for releasing them.

Such construction of the apparatus for electric-arc droplet surfacing with consumable electrodes under shileding gas provides for accelerating a molten droplet by accelerating the electrode and the tip with the aid of the drive for moving said tip, with the accelerating motion being transmitted through the electrode holder, and subsequently abruptly stopping the tip and the electrode with the aid of the tip movement arrester, when said tip is moving relative the nozzle. The molten droplet has a lesser contact with the tip, and, hence, is less cooled due to which there is provided a higher reliability of the droplet detachment in response to a control action applied to the electrode, and a transfer of practically all the molten metal onto the surface of the article being surfaced.

The electrode holder prevents the electrode slip relative the tip when the former and the latter are accelerated relative the nozzle. The pusher which is disposed in the electrode holder is used to release the clamping members if necessary, for instance, when the electrode is replaced.

Abruptly stopping the tip with the electrode by said arrester ensures the most efficient utilization of the kinetic energy the droplet acquires during acceleration, thereby providing for a reliable inertia detachment of the droplet from the electrode.

It is convenient to make such arrester in the form of a shoulder on the tip and a recess on the inner lateral surface of the nozzle at the location of said shoulder.

Such arrester being relatively simple in construction is sufficiently reliable in operation and provides an instantaneous cessation of the movement of the system "tip-electrode holder-electrode" as a result of the tip knocking against the nozzle. In this case the longitudinal vibration of said system relative the molten droplet on the electrode end is decreased, thereby facilitating the transmission of impact action to the latter.

It is expedient that the electrode holder be mounted within the tip. Such modification of the apparatus provide for that the deformation of the electrode in the apperture of the tip and in the other guiding openings of the apparatus is decreased since in this case the motion to the electrode is imparted through an electrode holder of a pulling and not of a pushing type. This is especially important in the case of using electrodes featuring low rigidity, in particular, the electrodes from stannic lead wire. It is also to be noted that such construction makes the apparatus more compact.

It is advisable to construct the electrode feeding means in the form of a driving unit provided with a movable member, and a second electrode holder adapted for clamping the electrode and feeding the same to the melting zone, both said driving unit and said second electrode holder being mounted within said body, with the second electrode holder being located before said first electrode holder with respect to the direction of feeding of the electrode and having a sleeve with clamping members disposed therein, a pusher rigidly connected with the movable member of the driving unit and mounted for acting upon said clamping members to release the latter, and a spring-loaded guide for the electrode, mounted for moving out from the sleeve and thereby acting upon a pushing rod of the first electrode holder.

Such construction of the apparatus makes it possible to feed the electrode with a predetermined force and to thereby rule out the distortion of the electrode in case the resistance to its motion sharply increases. Such increase in the resistance to the electrode motion may occur when the electrode is moved towards the surface of the article until it pushes thereagainst in the case when the travel length of the electrode is not equal or is not multiple to the distance between the electrode end and the surface of the article. Moving the electrode until it contacts the surface of the article, is required, for instance, for igniting the arc by short circuiting. In addition, the resistance to the electrode motion may be caused by jamming of the electrode in the aperture of the tip.

In all the above cases due to a rigid connection between the movable member of the driving unit and the pushing rod of the second electrode holder, and the possibility of moving said rod out from the sleeve to act upon the pusher of the first electrode holder, the clamping members of the latter are unclamped and the mechanical action upon the electrode is ceased as a result. In this case the force exerted upon the electrode is limited by the spring pressing and the guide against the clamping members of the second electrode holder.

Ruling out the electrode deformation decreases the amount of displacement of the molten droplet from the electrode axis, which promotes a higher accuracy of positioning the droplet onto the surface of the article.

It is possible to provide the pushing rod of the second electrode holder with an annular projection and to mount a spring between said shoulder and the butt end of the sleeve of this holder, which will enable the electrode force control range to be widened.

It should be noted that the force with which the spring presses the guide to the clamping members is selected depending not only on the electrode force but also on the clamping force with which the electrode is clamped by the clamping members, which clamping force should not be too great, as otherwise the surface of the electrode may be distorted. In most cases the electrode may be distorted. In most cases the electrode clamping force has to be less than the electrode moving force, which necessitates decreasing the latter.

The presence or the additional spring interposed between the shoulder of the pushing rod and the butt end of the sleeve makes it possible to select the electrode moving force depending on the force exerted by this spring irrespective of the electrode clamping force exerted by this spring irrespective of the electrode clamping force exerted by the clamping members. This allows a greater force to be used for moving the electrode, which is required, for example, in the cases when the electrode has to be moved to the surface of the article until it pushes thereagainst.

It is expedient to provide the apparatus with an additional nozzle encircling the first one and being secured thereon with an insulating spacer interposed between the former and the latter so that the end of the second nozzle is displaced relative the end of the first nozzle in the direction of feeding of the electrode for a length equal to from 0.05 to 0.1 diameters of the aperture of the first nozzle, and rests upon the surface of the article during surfacing.

Such construction of the apparatus of the invention ensures a high quality of the surface of the article being surfaced due to a limited zone of heating of the article surface.

It is to be noted in this connection that for limiting the heating zone on the surface of the article the nozzle is usually positioned so that the end thereof is as close to said surface as possible, in which case the zone of heating on the article surface is determined by the diameter of the aperture of this nozzle. Positioning the nozzle directly on the article being surfaced would limit said zone to the best, in which case, however the nozzle is connected through the article in the current circuit, which causes the arc to shift from the article to the nozzle. This result in that the surface of the article is not heated to the required temperature and the molten droplet falling onto said surface does not properly adhere thereto.

The presence of the second nozzle electrically insulated from the first one and resting upon the surface of the article during surfacing allows the first nozzle to be positioned at a distance from the surface of the article, which rules out shifting of the arc to the first nozzle.

The above value of displacement of the end of the second nozzle relative the end of the first nozzle in the direction of feeding of the electrode is optimum one. If the amount of this displacement is greater than 0.01 diameters of the aperture of the first nozzle the zone of heating of the article increases and does not lend itself to be influenced by the diameter of the aperture of this nozzle, thereby affecting the quality of the article surface. In case the amount of said displacement is less than 0.05 diameters of the working aperture of the first nozzle there occur a shift of the arc to the first nozzle as a result of bridging the gap between the article and this nozzle by the metal vapours, in which case said nozzle is placed into the current circuit.

The proposed apparatus may be variously otherwise constructed. For example, a modification of the apparatus is possible, wherein the second nozzle is provided with at least one opening for the discharge of the shielding gas, which will produce a directed flow of the shielding gas to remove from the heating zone the products resulting from the action of the arc on the material of the article being surfaced.

Such modification of the proposed apparatus is advisable for surfacing articles made from material which require that in the heating zone the cathode be properly cleaned from the oxide films, for example in the case of such materials as brass and alloyed steels.

An alternative modification of the apparatus is also possible wherein the second nozzle is provided with an elastic ring put thereon to seal the electrode melting zone, which makes it possible to reduce the consumption of the shielding gas and to prevent the gas from escaping between the butt end of the second nozzle and the surface of the article, and to thereby rule out heating of this surface.

Such modification of the apparatus is convenient in the case of surfacing articles made from such materials as white copper or cupronickel and the plated articles, which material do not require to be much cleaned.

BRIEF DESCRIPTION OF DRAWINGS

FIGS. from 1 to 5 schematically represent different steps of the surfacing process carried out by the apparatus according to the invention.

FIG. 1 schematically represents the beginning step of surfacing with the electrode pushed out from the tip towards the surface of the article for a predetermined length;

FIG. 2 schematically represents the step wherein an electric arc is ignited between the electrode and the surface of the article, with a molten droplet being formed on the electrode end at the end of the nozzle;

FIG. 3 schematically represents the step wherein the tip and the electrode with a molten droplet are accelerated in the direction of the surface of the article /the direction of their movement is shown by an arrow/;

FIG. 4 schematically represent the step wherein the tip and the electrode with a molten droplet are caused to abruptly stop by pushing against an arrester so as to cause the inertia detachment of the droplet from the electrode;

FIG. 5 schematically represents the final step at which the molten droplet has been already thrown down onto the surface of the article, and the tip with the electrode has been moved back to its initial position;

FIG. 6 is an elevation of the apparatus for carrying out electric arc droplet surfacing with consumable electrodes under shielding gas;

FIG. 7 is an elevation of the proposed apparatus wherein the electrode holder is mounted in the tip;

BEST MODE FOR CARRYING OUT THE INVENTION

Figure 8:
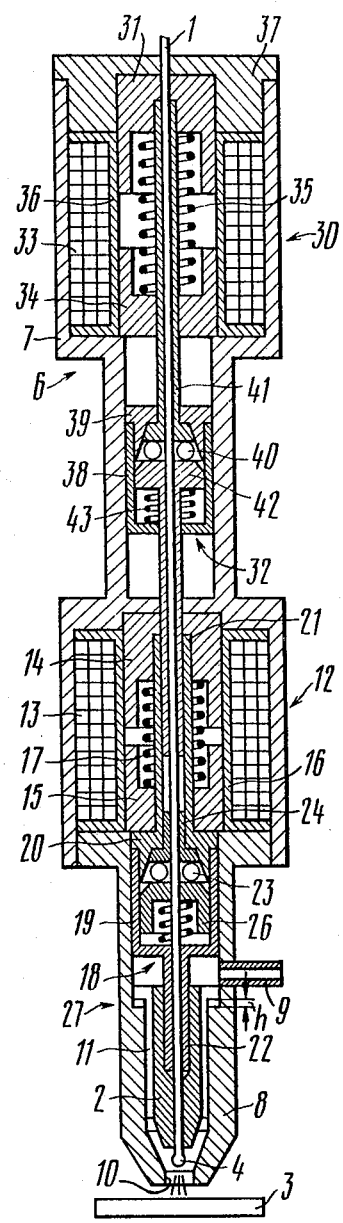
FIG. 8 shows a modification of the proposed apparatus wherein there are provided two electrode holders.

The proposed apparatus for electric arc droplet surfacing with consumable electrodes under shielding gas operates as follows.

A consumable electrode 1 /FIG. 1/ is fed through a current contact tip 2 to the surface of an article 3 by moving the electrode 1 from the end of the tip 2 to the surface of the article 3 for a predetermined length 1.

To the electrode 1 through the tip 2 and to the article 3 there is applied a voltage to ignite an arc between the electrode 1 /FIG. 2/ and the surface of the article 3 to cause the electrode 1 to melt so as to form a molten droplet on the end thereof, which molten droplet 4 is formed at the end of the tip 2. The diameter of the molten droplet which determines the mass thereof depends on the diameter of the electrode 1 and on the length 1 of its portion pushed forward.

Melting the electrode is done under shielding gas, for instance, argon which is fed into the melting zone.

After the article 3 is sufficiently heated the tip 2 /FIG. 3/ and the electrode 1 with the molten droplet 4 are accelerated in the direction of the surface of the article 3 until they acquire a speed at which the kinetic energy of the molten droplet 4 exceeds the energy which is sufficient for the droplet 4 to be detached from the electrode 1.

After travelling a predetermined length h /FIG. 1/ the thus accelerated tip 2 and electrode 1 are abruptly stopped with the aid of an arrester 5 /FIG. 4/ to cause the inertia detachment of the droplet 4 from the electrode 1 and fall onto the surface of the article 3, whereafter the tip 2 with the electrode 1 are moved back to their initial position, as shown in FIG. 5 of the accompanying drawings.

It should be noted that the proposed apparatus may operate with a stepwise feeding of the electrode 1 for a length 1, as described above and shown in FIG. 1 and a continuously feeding the electrode 1 with a speed exceeding the speed of its melting.

The length 1 of the portion at which the tip 2 and the electrode 1 with the molten droplet are accelerated is determined depending on the diameter of the electrode 1. It is expedient that the length 1 be equal to from 1 to 4 diameters of the electrode 1. Acceleration with which the tip 2 with the electrode 1 are caused to move at the length h may be different. However, the best accuracy in controlling the mass of the molten droplets 4 is achieved when the tip 2 with the electrode 1 are moved with a constant acceleration. The constant acceleration provides for a higher stability of the droplet shape and lesser oscillation of the droplet, and a smaller amount of displacement thereof from the axis of the electrode 1.

The best result is achieved when the tip 2 with the electrode 1 are moved with the acceleration in the range from 10 to 200 m/s$^2$ until they attain a speed from 0.2 to 3.0 m/s.

The acceleration and the speed of motion are selected depending on the diameter of the electrode 1 and the required mass of the molten droplet 4, as well as the material from which the electrode 1 is made. With the decrease of the diameter of the electrode 1 and the mass of the droplet 4 the acceleration and the speed should be also decreased.

Thus, for example, for 0.5–0.6 mm electrodes made from silver or gold, and the droplet having a mass of from 0.01 to 0.02 g the acceleration is 150 m.p.s.$^2$. and the speed of 2 m.p.s. For the 1.0–1.2 mm electrodes made from gold or silver, and droplets having a mass of from 0.1 to 0.2 g the acceleration is 20 m.p.s.$^2$., and the speed of 0.5 m.p.s.

The technique described above is carried out by the apparatus comprising a means 6 for feeding the consumable electrode 1 /FIG. 6/ to the surface of the article being surfaced, and a body 7 wherein there are mounted a nozzle 8 provided with an inlet pipe 9 for supplying a shielding gas into a cavity of the nozzle 8 and having a working aperture 10 adapted for directing said gas into the electrode 1 melting zone.

Introduced into the nozzle 8 is a current contact tip provided with an aperture for the electrode 1 to pass through and lateral slots 11 for passing the shielding gas from the inlet pipe 9 to the working aperture 10 of the nozzle 8.

Within the body 7 is also mounted a drive 12 adapted for acceleratingly moving the tip 2 relative the nozzle 8 in the direction of the article 3.

The drive 12 is made in the form of an electromagnet comprising a coil 13, a movable core 14, a stationary core 15, a guide bush 16, and a recoil spring 17 interposed between said cores.

Between the tip 2 and the drive 12 is disposed an electrode holder 18 adapted for clamping the electrode 1 with the molten droplet 4 and imparting thereto accelerating translatory motion from the drive 12. In this case use is made of the electrode holder 18 letting the electrode be passed therethrough in the direction of the surface of the article 3.

The electrode holder 18 comprises a sleeve 19 and a cap 20 rigidly connected thereto, which cap has a conical cavity. The cap 20 is provided with a tubular extension 21 wherethrough it is rigidly connected to the movable core 14 of the drive 12, and the sleeve 19 is provided with a tubular extension 22 by means of which it is rigidly connected to the tip 2. Such construction provides a rigid connection between the members of the system "movable core 14 of the drive 12—electrode holder 18—tip 2".

Disposed within the conical cavity of the cap 20 are clamping members 23 made in the form of balls, and a pusher 24 operatively connected with an extensible member 25 of the means 6 for feeding the electrode 1 and mounted for acting upon the clamping elements 23 for unclamping the latter. The clamping members 23 are placed on a spring-loaded sleeve 26 and pressed to the pusher 24.

The proposed apparatus further includes an arrester 27 for ceasing the movement of the tip 2 while the latter is moving relative the nozzle 8. The arrester 27 serves as a stationary barrier 5 /FIG. 1/ and may be variously constructed.

The most reliable in operation is an arrester which is made in the form of a shoulder 28 on the tip 2 and a recess 29 on the inner lateral surface of the nozzle 8 at the location of the shoulder 28. Between the shoulder 28 of the tip 2 and the recess 29 of the nozzle 8 there is provided a gap which is abovementioned length h /FIG. 1/ whereat there takes place accelerating translatory motion of the tip 2 and the electrode 1 with the molten droplet 4.

A more compact is the modification of the proposed apparatus wherein the electrode holder 18 is mounted within the tip 2 as shown in FIG. 7 of the accompanying drawings. According to this modification the sleeve 19 of the electrode holder 18 is made integral with the tip 2 and is rigidly connected to the cap 20.

Shown in FIG. 8 is a modification of the proposed apparatus which rules out distortion of the electrode 1 during its feeding to the surface of the article 3. In this modification the means 6 for feeding the electrode 1 is constructed in the form of a driving unit 30 /in this particular case an electromagnet/ provided with a movable member 31 /in this particular case a movable core of said electromagnet/, and the second electrode holder 32 adapted for clamping the electrode 1 and moving the latter to the melting zone. In this particular case use is made of the electrode holder 32 which is adapted for the electrode 1 to be passed therethrough only in the direction of the surface of the article 3.

The driving unit 30 includes a coil 33, a stationary core 34, and a recoil spring 35 interposed between the latter and the movable member 31. The movable member 31 and the stationary core 34 are mounted within a guide bush 36 with a cap 37 resting thereupon and being secured on the body 7.

The second electrode holder 32 is disposed before said electrode holder 18 relative the direction of the electrode 1 feeding and comprises a sleeve 38 and a cap 39 rigidly connected thereto, which cap 39 has a conical cavity. Disposed within the conical cavity of the cap 39 are clamping members 40 made in the form of balls, and a push rod 41 which serves as a guide for the electrode 1 and is rigidly connected to the movable member 31 of the driving unit 30 and adapted for acting upon the clamping members 40 for releasing them.

The clamping members 40 are arranged on a guide 42 for the electrode 1, which guide 42 is provided with a spring 43 and mounted within the sleeve 38 for moving out therefrom to act on the pusher 24 of the first electrode holder 18. The guide 42 serves as the abovementioned extensible member 25 /FIG. 7/ of the electrode feeding means 6.

Figure 9:
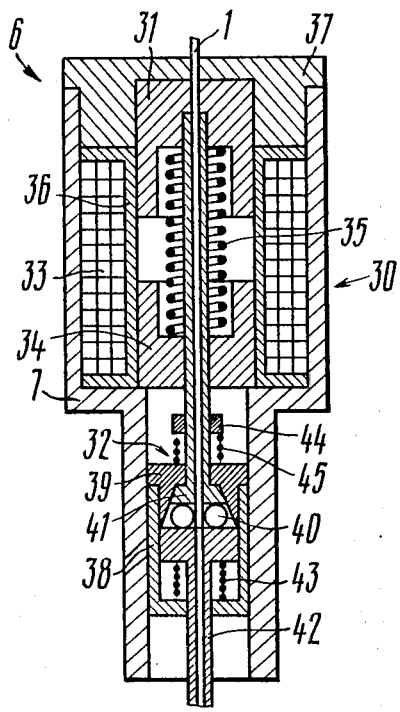
FIG. 9 is an elevation of the proposed apparatus wherein the pushing rod of the second electrode holder is provided with an annular shoulder.

Shown in FIG. 9 of the accompanying drawings is a modification of the proposed apparatus, which allows feeding the electrode 1 by applying thereto a considerable force without distorting said electrode 1 even in the cases when the movement thereof is sharply impeded.

In this modification the rod 41 of the second electrode holder is provided with an annular projection 44, and interposed between this projection 44 and the end face of the cap 39 of the electrode holder 32 is a spring 45.

Figure 10:
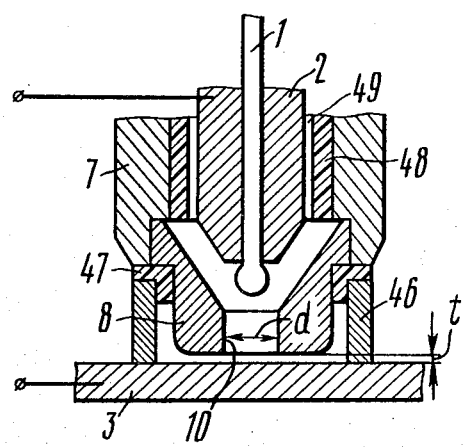
FIG. 10 is a modification of the proposed apparatus which is provided with a second nozzle.

A high quality of the surface of the article 3 being surfaced is ensured by a modification of the proposed apparatus shown in FIG. 10.

According to this modification the apparatus additionally includes a second nozzle 46 encircling said first nozzle 8. The nozzle 46 is mounted into the body 7 and secured thereon through an insulating spacer 47. The second nozzle 46 is secured on the first nozzle 8 so that the end of said second nozzle 46 is displaced relative the end of the first nozzle 8 in the direction of the electrode 1 feeding for a length t being from 0.05 to 0.1 diameters d of the working aperture 10 of the first nozzle 8 and rests during operation upon the surface of the article 3.

Electrical insulation of the tip 2 may be improved by that between this tip and the body 7 is interposed an insulating bush 48 enveloping said tip 2 and having slots 49 for supplying shielding gas into the cavity of the nozzle 8.

Figure 11:
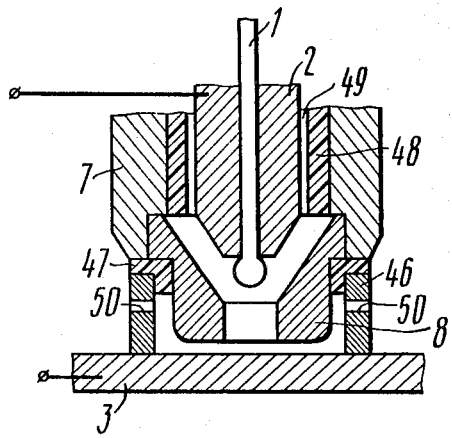
FIG. 11 shows the modification of the proposed apparatus wherein the second nozzle has at least one opening for discharging the shielding gas, elevational view.

A modification of the proposed apparatus shown in FIG. 11 is convenient for use in surfacing articles made from materials which require a high degree of the cathode cleaning of the surface from the products resulting from the arc action of the said surface, in particular from oxide films. In this modification the second nozzle 46 is provided with one or several openings 50 for discharging the shielding gas.

For reducing the consumption of the shielding gas during surfacing and improving the heating of the surface of the article being surfaced it is expedient to use a modification of the proposed apparatus shown in FIG.

12 of the accompanying drawings. In this modification the second nozzle 46 is provided with an elastic ring 51 put thereon and intended for sealing the electrode melting zone.

The proposed apparatus for electric-arc gas-shielded surfacing by molten droplets with consumable electrodes operates as follows.

The surfacing operation starts with that the electrode driving means 6 is switched on to move the electrode 1 through the current contact tip 2 towards the surface of the article 3, the electrode 1 being moved out from the end of the tip 2 for a predetermined length 1 as shown in FIG. 1 of the accompanying drawings. As the electrode holder 18 /FIG. 6/ is adapted to let the electrode be passed only in one direction, that is in the direction of the surface of the article 3, the electrode 1 cannot move in the opposite direction.

Thereafter between the electrode 1 and the surface of the article is ignited an arc to form on the end of the electrode 1 a molten droplet 4, which droplet 4 is formed at the end of the tip 2. Simultaneously, from a gas source /not shown/ to the melting zone of the electrode 1 is fed a shielding gas /in this particular case argon/ which is passed through the inlet pipe 9, the nozzle 8 cavity, the lateral slots 11 of the tip 2 and the working opening 10 of the nozzle 8.

After the molten droplet 4 has acquired the required mass and the surface of the article 3 is sufficiently heated the coil 13 of the drive 12 is energized. In response, the movable core 14 of the drive 12 by moving with acceleration in the direction of the surface of the article 3 accelerates the tip 2 and the electrode holder 18 which are rigidly connected to said movable core 14. The accelerating motion is also transmitted through the electrode holder 18 to the electrode 1 with the molten droplet 4.

During acceleration the spring-loaded sleeve 26 of the electrode holder 18 presses the clamping members 23 against the conical surface of the cap 20 and the electrode 1, whereby the latter is wedged and caused to move with acceleration together with the electrode holder 18.

The acceleration of said members is controlled by varrying the voltage applied to the coil 13 of the drive 12, and the characteristic of the spring 17.

As a result of the tip 2 shoulder 28 running against the stationary recess 29 of the nozzle 8 the tip 2 and the electrode 1 abruptly stop. At this moment the molten droplet 4 detaches from the electrode 1 end and falls onto the predetermined point on the surface of the article 3, as shown in FIG. 5.

Thereafter the coil 13 of the drive 12 is deenergized and the recoil spring 17 brings the movable core 14 and together therewith the electrode holder 18 and the tip 2 to their initial position. The electrode feeding means 6 prevents the backward motion of the electrode 1, the clamping members 23 of the electrode holder 18 are released, that is, they are not any longer pressed against the conical surface of the cap 20, thereby letting the electrode holder 18 move relative the electrode 1.

The apparatus of the invention, constructed according to a modification shown in FIG. 8 operates in the following manner.

Feeding the electrode 1 to the surface of the article 3 is effected by energizing the coil 33 of the driving unit 30. The movable member 31 moving towards the surface of the article 3 moves the pusher 41 which is rigidly connected to the member 31. The pusher 41 acts on the clamping members 40 which are simultaneously subjected to the action of the guide 42 which in turn is acted on by the spring 43. As a result, the clamping members 40 are pressed against the conical surface of the cap 39 and the electrode 1, thereby wedging the latter so as to cause it to be moved together with the electrode holder 32 relative the body 7 in the direction of the surface of the article 3.

In this case if the motion of the electrode 1 is sharply impeded /for instance the electrode 1 pushes with its end against the surface of the article 3/ the spring-loaded guide 42 and the clamping members 40 begin moving relative the sleeve 38 and the cap 39 in the direction of the surface of the article 3, since the force of the resistance to the motion exceeds the compressive force of the spring 43 of the guide 42. The clamping members 40 are released from the conical surface of the cap 39 and unclamp the electrode 1, as a result of which the electrode holder 32 slips with respect to the relatively immovable electrode 1.

When the coil 33 of the driving unit 30 is deenergized the spring 35 brings back the movable member 31 and together therewith the electrode holder 32 to their initial position. The electrode 1 is retained by the electrode holder 18, the clamping members 40 are not pressed any longer against the conical surface of the cap 39, and the electrode holder 32 slips relative the electrode 1.

In the above modification of the proposed apparatus the electrode force is controlled by varying the characteristic of the spring 43 of the guide 42. In the modification of the apparatus shown in FIG. 9 the electrode force is controlled by changing the characteristics of the springs 43 and 45.

According to a modification of the apparatus shown in FIG. 10 the apparatus is positioned before the surfacing operation so that the end of the second nozzle 46 rests on the surface of the article 3. Thereafter a shielding gas is fed through the working aperture 10 of the first nozzle 8 into the cavity defined by the outer surface of the nozzle 8, inner surface of the nozzle 46 and the surface of the article 3. Simultaneously with feeding the shielding gas there is ignited an arc between the end of the electrode 1 and the surface of the article 3. The zone of the arc action on the surface of the article 3 is limited by the diameter d of the working opening 10 of the nozzle 8.

In the case of a modification of the apparatus shown in FIG. 11 the products resulting from the interaction between the electric arc and the surface of the article 3 are removed from the melting zone together with the shielding gas through the openings 50 of the nozzle 46.

Figure 12:
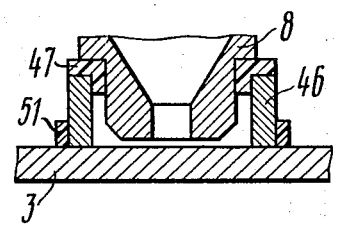
FIG. 12 shows the modification of the proposed apparatus wherein the second nozzle is provided with an elastic ring, elevational view.

In the case of a modification of the apparatus shown in FIG. 12 the elastic ring 51 seals the electrode 1 melting zone which allows batch feeding of shielding gas, thereby reducing the consumption thereof.

While particular embodiments of the invention have been shown and described, various modifications may be made in the invention without departing from the spirit of the appended claims.

INDUSTRIAL APPLICABILITY

The present invention may be used to best advantage for forming the contacts from silver, gold, platinum and other precious metals on contact holders made from conventional constructional materials in manufacturing switching equipment in electrical engineering and instrument making.

In addition, this invention may be used for welding and soldering by single droplets with consumable electrodes made from such materials as high-temperature solders, low-temperature solders and steels.

We claim:

1. An apparatus for electric-arc gas-shielded surfacing of an article by droplets with a consumable electrode having an electrode melting zone, comprising feeding means for feeding said consumable electrode to a surface of the article being surfaced, and a body wherein there are mounted a nozzle having a cavity provided with an inlet pipe for supplying a shielding gas into the cavity of said nozzle, and having an opening adapted for directing said shielding gas into the electrode melting zone, a current contact tip introduced into said nozzle and provided with an aperture for the electrode to pass through, and drive means for translatory moving the current contact tip with acceleration relative to the nozzle in the direction of the surface of the article, said apparatus further comprising arrester means for stopping the movement of the current contact tip while the current contact tip is moving relative to the nozzle, and electrode holder means for clamping the electrode with the molten droplet and imparting to said electrode and the current contact tip an accelerating translatory motion relative to the nozzle, said electrode holder means having a sleeve rigidly connected to the current contact tip and said drive, and clamping members disposed within said sleeve, and pusher means connected to the electrode feeding means and mounted on the clamping members for pushing the clamping members.

2. An apparatus as claimed in claim 1, wherein the arrester means is made in the form of a shoulder on the current contact tip and a recess on the inner lateral surface of the nozzle at the location of said shoulder.

3. An apparatus as claimed in any one of claims 1 or 2 wherein the electrode holder is mounted into the current contact tip.

4. An apparatus as claimed in any one of claims 1 or 2, wherein the feeding means is constructed in the form of a driving unit having a movable member and a second electrode holder for clamping the electrode and moving the electrode to the electrode melting zone, said driving unit and said second electrode holder being mounted within the body, with the second electrode holder positioned before said first electrode holder with respect to the direction of feeding of the electrode and having a sleeve with clamping members arranged therein, a pushing rod rigidly connected to the movable member of the driving unit and mounted for acting upon the clamping members for releasing them, and a spring-loaded guide for the electrode, mounted for moving out from the sleeve and thereby acting upon the pusher means of the first electrode holder.

5. An apparatus as claimed in claim 4, wherein the pushing rod of the second electrode holder is provided with an annular projection, and between said projection and the butt end of the sleeve of said electrode holder is interposed a spring.

6. An apparatus as claimed in any one of claims 1 or 2, further comprising a second nozzle encircling said first nozzle and secured thereto through an insulating spacer so that an end of the second nozzle is displaced relative to an end of the first nozzle in the direction of feeding of the electrode for a length from 0.05 to 0.1 diameters of a working aperture of the first nozzle and rests upon the surface of the article during surfacing.

7. An apparatus as claimed in claim 6, wherein the second nozzle is provided with at least one opening for discharging the shielding gas.

8. An apparatus as claimed in claim 6, wherein the second nozzle has an elastic ring put thereon and intended for sealing the electrode melting zone.

9. An apparatus as claimed in claim 3, wherein the feeding means is constructed in the form of a driving unit having a movable member and a second electrode holder for clamping the electrode and moving the electrode to the electrode melting zone, said driving unit and said second electrode holder being mounted within the body, with the second electrode holder positioned before said first electrode holder with respect to the direction of feeding of the electrode and having a sleeve with clamping members arranged therein, a pushing rod rigidly connected to the movable member of the driving unit and mounted for acting upon the clamping members for releasing them, and a spring-loaded guide for the electrode mounted for moving from the sleeve and thereby acting upon the pusher means of the first electrode holder.

10. An apparatus as claimed in claim 3, further comprising a second nozzle encircling said first nozzle and secured thereto through an insulating spacer so that an end of the second nozzle is displaced relative to an end of the first nozzle in the direction of feeding of the electrode for a length from 0.05 to 0.1 diameters of a working aperture of the first nozzle and rests upon the surface of the article during surfacing.

11. An apparatus as claimed in claim 4, further comprising a second nozzle encircling said first nozzle and secured thereto through an insulating spacer so that an end of the second nozzle is displaced relative to an end of the first nozzle in the direction of feeding of the electrode for a length from 0.05 to 0.1 diameters of a working aperture of the first nozzle and rests upon the surface of the article during surfacing.

12. An apparatus as claimed in claim 5, further comprising a second nozzle encircling said first nozzle and secured thereto through an insulating spacer so that an end of the second nozzle is displaced relative to an end of the first nozzle in the direction of feeding of the electrode for a length from 0.05 to 0.1 diameters of a working aperture of the first nozzle and rests upon the surface of the article during surfacing.

* * * * *